Patented Feb. 14, 1933

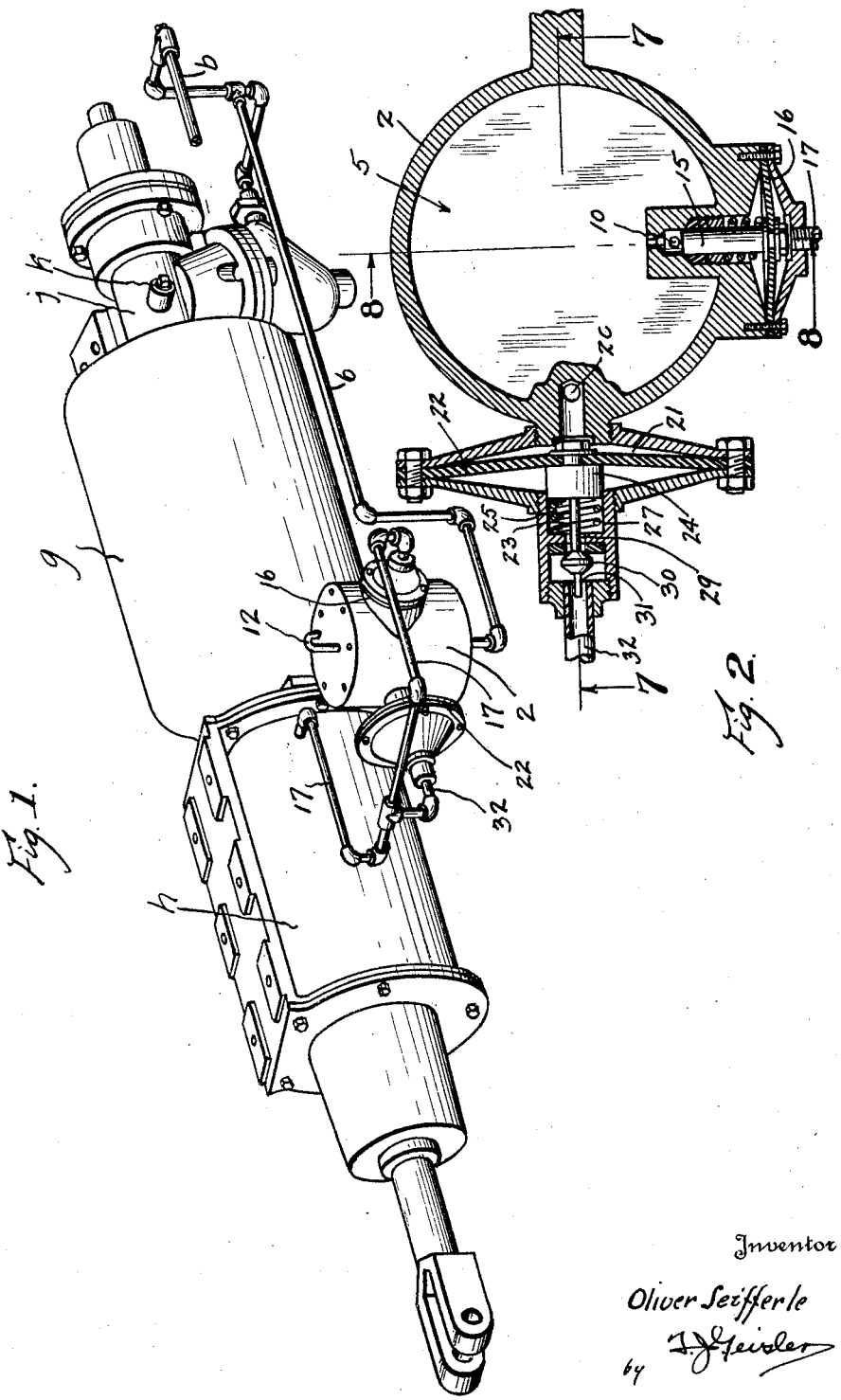

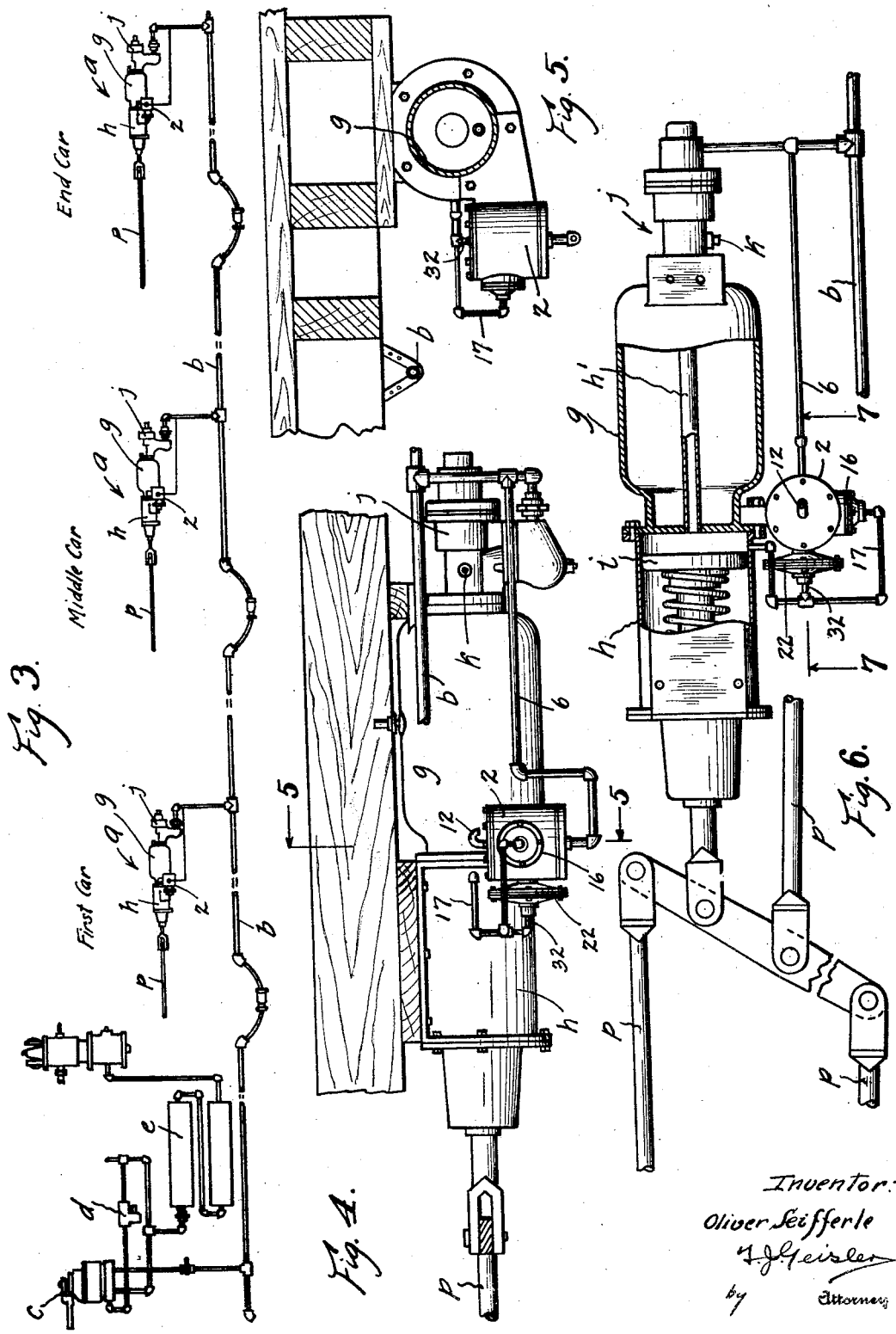

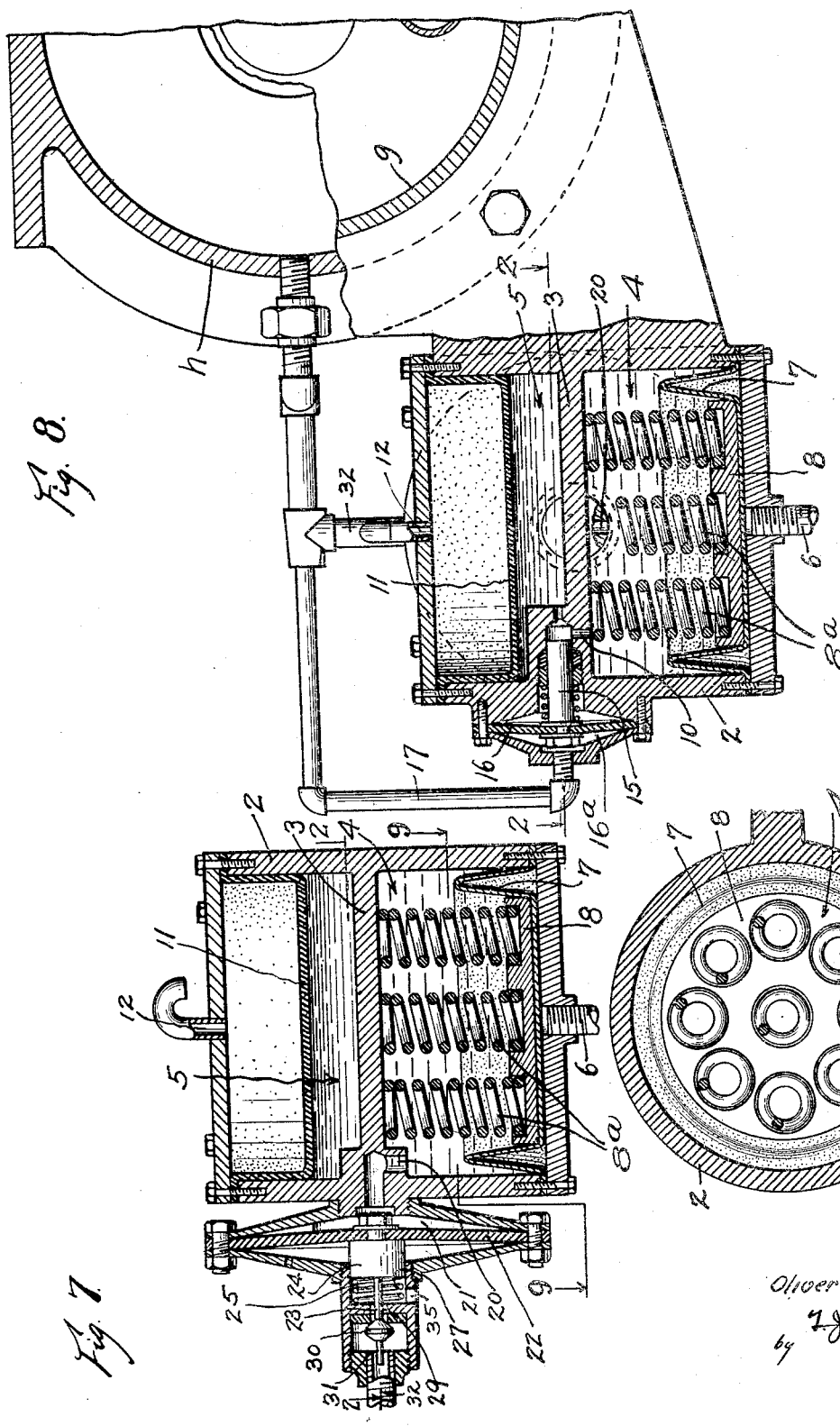

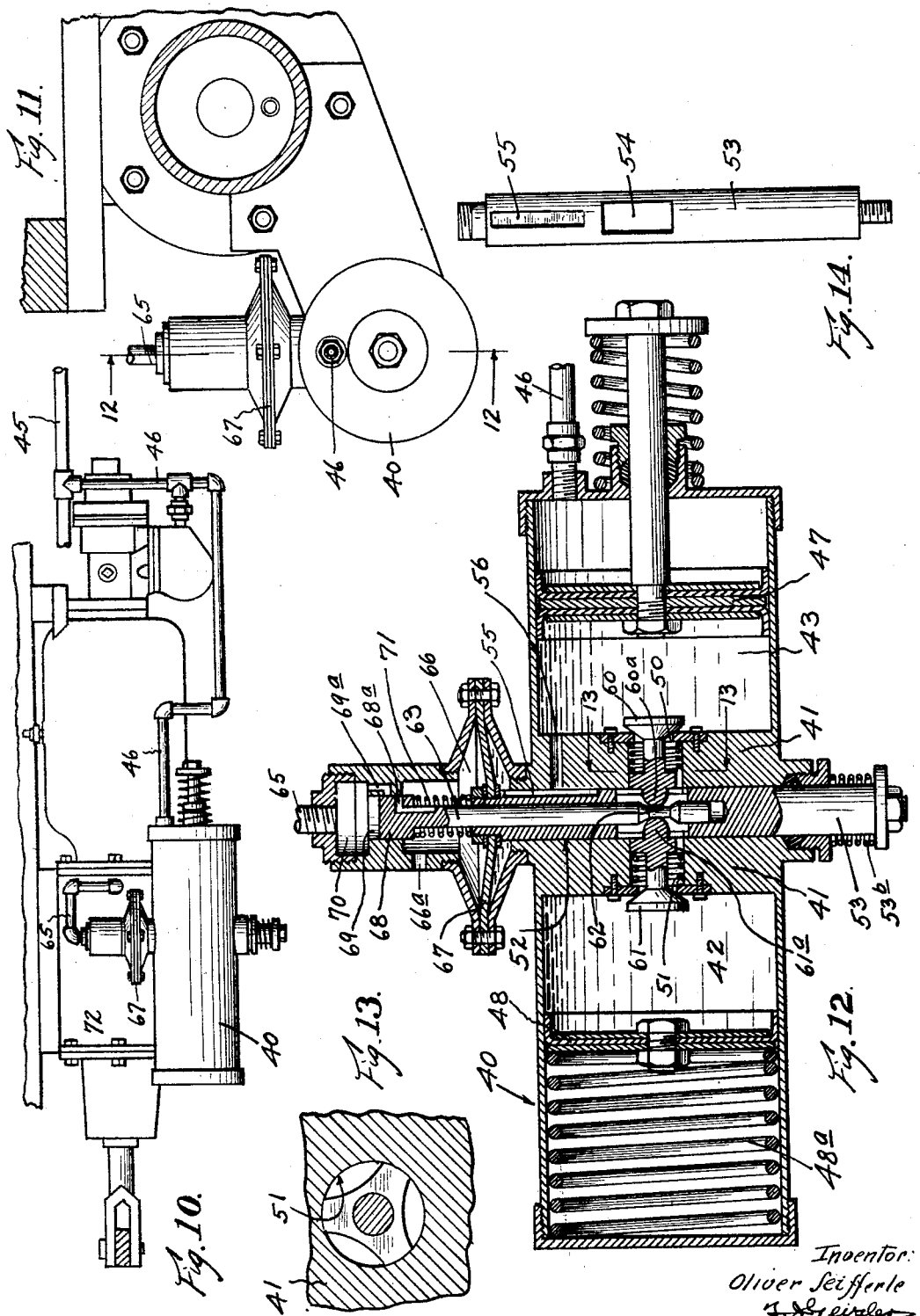

1,897,339

UNITED STATES PATENT OFFICE

OLIVER SEIFFERLE, OF PORTLAND, OREGON, ASSIGNOR TO INTERNATIONAL AIR BRAKE CONTROL COMPANY, OF PORTLAND, OREGON, A CORPORATION OF OREGON

PRESSURE CONTROL VALVE FOR AUTOMATIC AIR BRAKES

Application filed March 29, 1930. Serial No. 440,023.

The automatic air brake mechanisms in common use on railroad trains consist of individual brake operating units carried by each car, and adapted to be actuated simultaneously by compressed air from the locomotive.

A brake operating unit, as well known, comprises an auxiliary air reservoir connected with the brake cylinder through one of the ports of an automatically operating triple valve, the other ports of which are connected respectively with the brake pipe and the exhaust port from the brake cylinder.

The port of the triple valve connecting the brake pipe with the auxiliary reservoir is adapted to remain open and permit the air pressure to flow into the said reservoir, as long as the pressure in the brake pipe is greater than the pressure in the auxiliary reservoir. At this time the auxiliary reservoir is shut off from the brake cylinder and the exhaust port of the brake cylinder is open so that the brakes are inoperative. The apparatus is now in what is known as the "release position".

To apply the brakes, pressure in the brake pipe is exhausted to below the pressure in the reservoir, which causes the triple valve to close the exhaust and brake pipe ports and open the port into the brake cylinder from the auxiliary reservoir, which will cause the brakes to be applied proportionately to the amount of air exhausted from the brake pipe. The apparatus is now in what is known as the "service position".

To release the brakes, the triple valve may be brought back to release position, which will allow the air to exhaust from the brake cylinder and connect the brake pipe at full main reservoir pressure, with the auxiliary reservoir to replace the pressure exhausted by the service position.

Intermediate the release position and service position of the brake valve is the "running position" in which the brakes are released and the auxiliary reservoir is open to the brake pipe, at a limited pressure, normally 70 pounds gauge pressure, so that the pressure in the auxiliary reservoir is thus maintained sufficient for the application of the brakes in the service position of the brake valve.

However, it is to be noted that by this construction, when the brakes have been applied, the pressure in the auxiliary reservoirs can not be recharged without releasing the brakes, for to actuate the triple valve to open the port from the brake pipe into the auxiliary reservoir the pressure in the brake pipe must necessarily be greater, which will, as before mentioned, cause the brake cylinder exhaust port to open and release the brakes.

As a result, when frequent applications of the brakes have been made, as on a long, down grade, the pressure in the auxiliary reservoir will have fallen to such a point that the brakes will be incapable of further application, and it is impossible for the engineer to replenish the auxiliary reservoir without releasing the brakes, for to do so will cause the brake pipe pressure to be greater than the auxiliary reservoir pressure with the result that the brakes will be inadvertently released by the opening of the brake cylinder exhaust port, and thus cause the engineer to lose control of the train as far as the brakes are concerned.

To prevent such inadvertent release of the brakes, and to permit pressure to be admitted into the auxiliary reservoir without releasing the brakes, pressure retaining valves are provided on the exhaust ports of the brake cylinders which are manually adjusted so as to prevent air from exhausting from the brake cylinder below a predetermined pressure, usually 10 to 20 pounds, until manually operated by the brakeman by going the length of the train and releasing each valve individually, and thus the automatic operation of the brakes is suspended, and the engineer does not have complete control of the train.

Furthermore, because of the natural frictional resistance to the flow of compressed air in a pipe, an increase of pressure in the brake pipe, when the brakes are to be released, will be delayed in reaching the end of the brake pipe, so that the brakes at the head of a long train will have been entirely released before those at the end will have even begun to release with obvious undesirable results.

Therefore, the principal object of my invention is to provide an auxiliary pressure control for air brake mechanisms adapted upon an increase of pressure in the brake pipe, to release the brakes substantially simultaneously throughout the length of the train, regardless of its length and the variations of pressure in the brake pipe.

A further object of my invention is to provide an auxiliary pressure control adapted to permit the auxiliary reservoir to be recharged, by an increase of pressure in the brake pipe under all conditions, without causing the before mentioned inadvertent release of the brakes, and thus eliminate the pressure retaining valves and provide complete and reliable control of the brakes at all times by the engineer.

These and other incidental features of my invention, the details of construction and mode of operation are hereinafter fully described with reference to the accompanying drawings.

In the drawings:

Fig. 1 shows a perspective view of an automatic brake operating unit and illustrates my pressure control valve connected thereto;

Fig. 2 shows a section taken on the lines 2—2 of Figs. 7 and 8 and illustrate the details of construction of my pressure control valve;

Fig. 3 illustrates diagrammatically the automatic air brake system of a railroad train and shows my pressure control valve connected with each unit;

Fig. 4 shows an enlarged side elevation of a brake operating and my pressure control valve unit as illustrated in Fig. 1;

Fig. 5 shows an end elevation of the brake operating unit taken on the line 5—5 of Fig. 4, and further illustrates the connections of my pressure control valve therewith;

Fig. 6 shows an enlarged plan view of the brake operating unit as shown in Fig. 2, and illustrates by parts broken away the details of the brake cylinder and connections of my pressure control valve;

Fig. 7 shows an enlarged section through my pressure control valve and the brake cylinder, taken on the line 7—7 of Figs. 2 and 6, and illustrates the details of my invention;

Fig. 8 shows a section taken on the line 8—8 of Fig. 2;

Fig. 9 shows a section taken on the line 9—9 of Fig. 7;

Fig. 10 shows a modification of my invention and illustrates its connections with the brake operating unit;

Fig. 11 shows an end elevation of the same;

Fig. 12 shows a section taken on the line 12—12 of Fig. 11;

Fig. 13 shows a section taken on the line 13—13 of Fig. 12; and

Fig. 14 shows a side elevation of the diaphragm shaft removed from the casing, and illustrates the ports provided therein.

Referring now to Figs. 1 to 9: I will first briefly describe the automatic air brakes in present use. In Fig. 3 is diagrammatically shown how the brake operating units $a$ are connected into the main air or brake pipe $b$, and the connection of the latter with the brake valve $c$, the feed valve $d$ and the main reservoirs $e$, from which compressed air is supplied to the brake pipe $b$.

A brake operating unit comprises an auxiliary reservoir $g$ and a brake cylinder $h$, in which is provided a piston $i$ connected to the brake shoe operating rods $p$ in the usual manner, the brake shoes not being shown.

The brake cylinder $h$ is connected with the auxiliary reservoir $g$ through a conduit $h'$ which is controlled by the well known triple valve $j$. The triple valve $j$ is connected to the brake pipe $b$ and controls the exhaust port $k$ from the conduit $h'$ which in this embodiment of my invention is permanently closed.

In operation the triple valve is adapted, when the pressure in the brake pipe is greater than the pressure in the auxiliary reservoir, to admit compressed air into the auxiliary reservoir from the brake pipe, and at the same time to hold the conduit $h'$ from the brake cylinder closed, and the exhaust port $k$ open. The brakes are operated by exhausting air from the brake pipe through the brake valve $c$, which then causes the triple valve $j$ to close the auxiliary reservoir from the brake pipe and the exhaust port $k$, and open the conduit $h'$ from the auxiliary reservoir $g$ to the brake cylinder, thus the brakes will be applied, theoretically, proportionately to the amount of air exhausted from the brake pipe.

To release the brakes, the pressure in the brake pipe is increased by operation of the brake valve $c$ to a pressure greater than the pressure in the auxiliary reservoir $g$, which will close the conduit $h'$ from the brake cylinder and open the exhaust port $k$, thus releasing the pressure in the brake cylinder and at the same time again admitting pressure into the auxiliary reservoir.

Thus, it is apparent that the compressed air cannot be admitted into the auxiliary reservoir without releasing the brakes and also that when the brakes are released, those at the head of the train will be actuated first, since an increase in the pressure in the brake pipe will be first felt at the head of the line and the longer the train, the greater the lapse of time before the brakes at the end will be actuated.

Referring now to Figs. 2, 7 and 8, my pressure control comprises a casing 2, supported conveniently from the brake cylinder $h$ and internally divided by a wall 3 to form an interior pressure chamber 4 and an interior relief of overflow chamber 5. The pressure chamber 4 is connected through a pipe 6, with the brake pipe $b$ and is provided with a flexible lining 7 of leather or the like. A spring controlled plunger 8 is arranged to bear on the said lining 7 and preferably oil or other non-compressible liquid is contained therein which overflows through an outlet 10 into the chamber 5. Springs 8a are provided in the chamber 4 bearing on the plunger 8 adapted to impose a resistance to the brake pipe pressure entering through the pipe 6. The chamber 5 is provided with a flexible lining 11 secured at its edges to the top of the chamber and resting on the normal oil level therein. An air port 12 is provided in the top of the chamber 5 to permit displacement of the air from within.

The anterior chamber 4 and the interior overflow chamber 5 are connected by a relief port 10 controlled by a normally open piston valve 15 connected to and operated by a diaphragm 16 provided in an auxiliary chamber 16a. The side of the chamber 16a opposite the piston valve 15 is connected thru a pipe 17 with the brake cylinder and thus is adapted to be closed by pressure in the latter.

Another passageway 20 is provided in the wall 3, which communicates with a diaphragm chamber 21, in which is provided a diaphragm 22 adapted to be operated by the liquid pressure in the chamber 4.

The opposite side of the diaphragm 22 is provided with a piston 24 movable in a chamber 25 and is provided with a stem 23 extending through a port 29 in the opposite end of the chamber 25. A valve member 30 is provided on the end of the stem 23, adapted to seat on the port 29 in one position and on an oppositely arranged port 31 in another; the latter port being connected with a pipe 32 connected to the pipe 17 and the brake cylinder $h$.

The chamber 25 is provided with an exhaust port 35 to the atmosphere and with a spring 27 adapted to normally hold the valve member 30 seated on the said port 29.

The exhaust port $k$ of the triple valve is permanently closed and thus all exhaust therefrom takes place through the pipe 17 and port 35, which is controlled by the valve 30.

*Operation.*—Assuming the train is standing and the brake mechanism and my pressure control is to be initially charged to the usual seventy pounds gauge pressure, pressure will then enter chamber 4 from the brake pipe and move the plunger 8 upward against the force of the springs 8a, and the oil above the flexible lining 8 will, following the line of least resistance, pass thru the relief port 10 into the interior or overflow chamber 5 and thus will not act on diaphragm 22 in the chamber 21.

When the brakes have been applied, by exhausting pressure from the brake pipe $b$, the plunger 8 falls a proportionate distance to the amount of air exhausted and a portion of oil flows back from the overflow or interior chamber 5 into the chamber 4 before the resulting pressure created in the brake cylinder $h$ actuates the diaphragm 16 to cause the piston valve 15 to close the relief port 10 and cut the chamber 4 off from the chamber 5.

At this time, in order to bring the brake pipe pressure quickly back to the normal 70 pounds gauge pressure, the engineer sets the brake valve $c$ at full release position, which admits air into the brake pipe at full main reservoir pressure, usually 130 pounds gauge pressure in order to quickly raise the pressure in the brake pipe the full length of the train, to recharge the auxiliary reservoirs. This normally would cause the unintended release of the brakes as mentioned. But with my pressure control the plunger 8 is forced upwardly and the oil is forced against the diaphragm 22, the relief port 10 being closed by the brake cylinder pressure, and seats the valve 30 on the port 31 thus preventing the inadvertent release of the brakes. Then to avoid overcharging the auxiliary reservoirs, the engineer moves the brake valve $c$ to running position, which reduces the pressure flowing into the brake pipe to 70 pounds gauge pressure again.

However, since 70 pounds was the normal gauge pressure in the brake pipe before the brakes were applied the engineer would find that the plunger 8 had fallen to the position held at the time the brake mechanism was initially charged, i. e. 70 pounds gauge pressure, which would release the oil pressure on the diaphragm 22 to cause the valve 30 to move off the port 31 by the force of the spring 27 and thus release the brakes.

Therefore as a preliminary to returning the control valve $c$ to running position, the engineer must operate the brake pipe feed valve $d$ to reduce the brake pipe pressure a few pounds below 70 pounds gauge pressure and thus permit the plunger 8 to fall below its former position when the brake mechanism was initially charged and lower the oil pressure on the diaphragm 22 so that the brake cylinder pressure acting on valve 30, plus the force of spring 27 will move the latter quickly off the port 31 and seat it on the port 29, thus preventing the brakes from being unintentionally released.

It is therefore evident that with my pressure control the auxiliary reservoir may be recharged at any time without releasing the brakes to replace the air exhausted in applying the brake, since the exhaust port $k$ is permanently closed and the release of pressure from the brake cylinder is controlled by my pressure control.

Now, assuming the brakes are released by increasing the pressure in the brake pipe: Normally without my pressure control such increase of pressure would act first on the triple valves near the locomotive and release these brakes before the brakes at the end of the train can be released.

But with my pressure control, the increase of pressure near the locomotive enters chamber 4 and forces plunger 8 upward and the oil in said chamber against diaphragm 22 and moves the latter and valve 30 all the way outward against the combined force of spring 27 and the pressure in the brake cylinder acting on piston 30 and seats the valve 30 on the port 31. Thus the immediate release of the brakes in this part of the train is prevented.

Further back in the train, however, where the increase of brake pipe pressure would be normally insufficient to release the brakes, the brake pipe pressure in chamber 4 will be strong enough, however, to unseat valve 30 from port 29 and thus will release these brakes. Then, as soon as the pressure in the brake pipe near the locomotive has fallen, due to the equalizing of pressure throucut the brake pipe and to the pressure normally taken from the brake pipe to recharge the auxiliary reservoirs, the brake cylinder pressure acting on the valve 30, plus the force of spring 27 will overcome the brake pipe pressure in chamber 4 and unseat valve 30 from port 31 and thus permit the brakes in this part of the train to release.

Thus the brakes are all released substantially simultaneously, since the delay of the pressure in reaching the end of the train is equal to the time the release of the brakes near the locomotive was retarded.

Further, if the brakes have been forcibly applied, the resulting fall in pressure in the brake pipe will set up reflex pressure waves, tending to cause rises in pressure in the brake pipe sufficient to actuate the triple valves to inadvertently release some of the brakes, but with my pressure control such rise in brake pipe pressure will act on diaphragm 22 to hold valve 30 on port 31 and thus prevent such inadvertent release.

Referring now to Figs. 10 to 14: I will now describe a modification of my pressure control valve in which the casing 40 is transversely divided by a wall 41 to form chambers 42, 43 filled to capacity with oil or other suitable liquid. The chamber 43 is connected with the brake pipe 45 by a pipe 46. A spring controlled piston 47 is provided in said chamber 43, adapted to be actuated by pressure from the pipe 46.

The chamber 42 is also provided with a spring controlled piston 48 adapted to be actuated by pressure of the liquid admitted through communicating ports 50, 51 in the wall 41.

The wall 41 is provided with a longitudinal bore 52, in which is arranged a longitudinally recessed shaft 53, having a transverse, elongate slot 54, and a longitudinal groove 55 adjacent its upper end. A port 56 from the chamber 43 connects with the groove 55. Valve members 60, 61 are seated respectively in the ports 50, 51 having extensions 60a, 61a which normally bear in an annular groove 62 in a valve stem 63 which is slidably mounted in the recess of the shaft 53 and extends upwardly into a diaphragm chamber 66 provided with an exhaust port 66a above the diaphragm.

The shaft 53 also extends into the chamber 66 and is connected to a diaphragm 67 provided therein. The lower end of the shaft 53 is provided with a spring 53b adapted to counteract the normal pressure of the oil in the chamber 43, created by the tension of the spring 48a on the piston 48.

The upper end of the stem 63 projects through the said diaphragm chamber 66 and is provided with a valve head 68 slidably mounted in a passageway 69. The valve head 68 is provided with an angular duct 68a communicating with the diaphragm chamber 66, and the wall of the passageway 69 is provided with a similar duct 69a communicating with a chamber 70 above, and is adapted to register with the duct 68a in one position of the said valve head 68.

A spring 71 is provided between the valve head 68 and the upper end of the shaft 53. The chamber 69 is connected with a pipe 65 connected to the brake cylinder 72 of the brake unit.

I will now briefly describe the operation of this modification of my invention which in all respects is similar to that already described with reference to Figs. 1 to 9.

In operation, when the brakes are released and there is no pressure in the brake cylinder, the spring 71 holds the valve head 68 lifted to a point where the ducts 68a, 69a are in registration, and thus the brake cylinder is open to the atmosphere.

However, when the brakes are applied, the resulting pressure in the brake cylinder will cause the valve head 68 to move downward moving the ducts 68a, 69a out of registration and thus preventing the escape of pressure therefrom to the atmosphere, and hence the release of the brakes.

At this time, in order to bring the brake pipe pressure quickly back to the normal 70 pounds gauge pressure through the entire length of the train, the engineer sets the brake valve at full release position, which admits air into the brake pipe and the auxiliary reservoirs at full main reservoir pressure, usually 130 pounds gauge pressure, which, without my pressure control valve, would cause the triple valve to release the brakes, inadvertently.

But with my pressure control valve, the piston 47 is moved inward forcing oil through the port 56 and groove 55 against the diaphragm 67, causing the shaft 53 to move upward and also the valve head 68 until the ducts 68a, 69a are moved past each other, thus preventing the escape of pressure from the brake cylinder. Simultaneously the upward movement of the stem 63 causes the valves 60, 61 to open the communicating ports 50, 51 and thus permit oil pressure to flow from the chamber 43 to the chamber 42 and release the diaphragm 67, which will move downward, and permit the valve head 68 to be moved downward also, under the force of the pressure in the brake cylinder, until the ducts 68a, 69a have passed again to the lowermost position and again the communicating ports 50, 57 will be closed.

Then, to avoid overcharging the auxiliary reservoirs, the engineer will move the brake valve back to running position, which reduces the pressure flowing into the brake pipe again to 70 pounds gauge pressure.

However, since 70 pounds is the normal gauge pressure before the brakes are applied this would tend to release the brakes, since piston 47 will have moved back to the position held at the previous running position, i. e. 70 pounds gauge pressure, which would otherwise act on the diaphragm 67 to cause the valve head 68 to move upwardly, and bring the ducts 68a, 69a again into registration with the port 32 and thus release the brake.

Therefore, as a preliminary to returning the control valve to running position, the engineer must operate the brake pipe feed valve to reduce the brake pipe pressure a few pounds below 70 pounds gauge pressure and thus permit the piston 47 to move back beyond its former running position and lower the oil pressure on the diaphragm 67 and move the valve head 68 and the ducts 68a, 69a quickly past each other, thus preventing the brakes from being released.

Now, when the brakes are released by increasing the pressure in the brake pipe, the plunger piston 47 is again forced inward, which forces the liquid against the diaphragm 67 which lifts the shaft 53 and valve head 68 until the ducts 68a, 69a are brought into registration, and hence permits pressure from the brake cylinder to escape through the port 66a and cause the brakes to release.

I claim:

1. In an air brake mechanism of the character described, an auxiliary pressure control comprising a control valve connected with the brake cylinder and provided with a pressure chamber connected with the brake pipe, said control valve comprising a valve chamber having inlet and outlet ports, the latter connected with an exhaust port, a valve member in said chamber adapted to seat on either of said ports, a stem connecting said valve member with a diaphragm, a passageway connecting the other side of said diaphragm with said pressure chamber, whereby a predetermined pressure in said pressure chamber will cause said diaphragm to unseat the valve member from said outlet port and a greater pressure will cause said diaphragm to seat the valve member on said inlet port for the purpose set forth.

2. In an air brake mechanism of the character described, an auxiliary pressure control comprising a control valve connected with the brake cylinder and provided with a pressure chamber connected with the brake pipe, said control valve comprising a valve chamber having inlet and outlet ports, the latter connected with an exhaust port, a valve member in said chamber adapted to seat on either of said ports, a stem connecting said valve member with a diaphragm, resilient means normally holding said valve member on said outlet port, a passageway connecting the other side of said diaphragm with said pressure chamber, whereby, a predetermined pressure in said pressure chamber will cause said diaphragm to unseat the valve member from said outlet port and a greater pressure will cause said diaphragm to seat the valve member on said inlet port for the purpose set forth.

3. In an air brake mechanism of the character described, an auxiliary pressure control comprising a control valve connected with the brake cylinder and provided with a pressure chamber connected with the brake pipe, said control valve comprising a valve chamber having inlet and outlet ports, the later connected with an exhaust port, a valve member in said chamber adapted to seat on either of said ports, a stem connecting said valve member with a diaphragm, a spring normally holding said valve member on said outlet port, a passageway connecting the other side of said diaphragm with said pressure chamber, whereby a predetermined pressure in said pressure chamber will cause said diaphragm to unseat the valve member from said outlet port and a greater pressure will cause said diaphragm to seat the valve member on said inlet port for the purpose set forth.

4. In an air brake mechanism of the character described, an auxiliary pressure control comprising a control valve connected with the brake cylinder and provided with a pressure chamber connected with the brake pipe, said control valve comprising a valve chamber having inlet and outlet ports, the latter connected with an exhaust port, a valve member in said chamber adapted to seat on either of said ports, a stem connecting said valve member with a diaphragm, a passageway leading from said pressure chamber to the other side of said diaphragm and a relief valve in said pressure chamber comprising a piston, a diaphragm connected to said piston, the other side of said diaphragm connected to the exhaust port of the brake cylinder.

5. In an air brake mechanism of the character described, an auxiliary pressure control comprising a control valve connected with the brake cylinder and provided with a pressure chamber connected with the brake pipe, said control valve comprising a valve chamber having inlet and outlet ports, the latter connected with an exhaust port, a valve member in said chamber adapted to seat on either of said ports, a stem connecting said valve member with a diaphragm, resilient means normally holding said valve member on said outlet port, a passageway connecting the other side of said diaphragm with said pressure chamber and a relief valve in said pressure chamber comprising a piston, a diaphragm connected to said piston, the other side of said diaphragm connected to the exhaust port of the brake cylinder, resilient means normally holding said valve open.

6. In an air brake mechanism of the character described, an auxiliary pressure control comprising a control valve connected with the brake cylinder and provided with a pressure chamber connected with the brake pipe, said control valve comprising a valve chamber having inlet and outlet ports, the latter connected with an exhaust port, a valve member in said chamber adapted to seat on either of said ports, a stem connecting said valve member with a diaphragm, a spring normally holding said valve member on said outlet port, a passageway connecting the other side of said diaphragm with said pressure chamber and a relief valve in said pressure chamber comprising a piston, a diaphragm connected to said piston, the other side of said diaphragm connected to the exhaust port of the brake cylinder, a spring normally holding said valve open.

7. In an automatic air brake mechanism the combination of a control valve comprising a valve chamber having inlet and outlet ports, the latter connected with an exhaust port, a valve member in said chamber adapted to seat on either of said ports, a stem connecting said valve member with a diaphragm, said control valve including a pressure chamber, the pressure chamber provided with inlet and outlet ports, the inlet port connected with a source of air pressure, a non-compressible liquid in said chamber above said plunger, a yieldable plunger and a fluid in said chamber adapted to be acted upon by compressed air from said inlet and a passageway from said pressure chamber to said control valve diaphragm whereby a predetermined pressure at the inlet of said pressure chamber will actuate said plunger to force the said non-compressible fluid against the control valve diaphragm and unseat said control valve member from the said outlet port, and a greater pressure will seat said valve member on said inlet port.

8. In an automatic air brake mechanism the combination of, a control valve comprising a valve chamber having inlet and outlet ports, the latter connected with an exhaust port, a valve member in said chamber adapted to seat on either of said ports, a stem connecting said valve member with a diaphragm, resilient means normally holding said valve member on said outlet port, said control valve including a pressure chamber, the pressure chamber provided with inlet and outlet ports, the inlet port connected with a source of air pressure, a non-compressible liquid in said chamber above said plunger, a yieldable plunger and a fluid in said chamber adapted to be acted upon by compressed air from said inlet and a passageway from said pressure chamber to said control valve diaphragm whereby a predetermined pressure at the inlet of said pressure chamber will actuate said plunger to force the said non-compressible fluid against the control valve diaphragm and unseat said control valve member from the said outlet port, and a greater pressure will seat said valve member on said inlet port.

9. In an automatic air brake mechanism the combination of, a control valve comprising a valve chamber having inlet and outlet ports, the latter connected with an exhaust port, a valve member in said chamber adapted to seat on either of said ports, a stem connecting said valve member with a diaphragm, a spring normally holding said valve member on said outlet port, said control valve including a pressure chamber, the pressure chamber provided with inlet and outlet ports, the inlet port connected with a source of air pressure and having a flexible lining separating the inlet port from said chamber, a non-compressible liquid in said chamber above said plunger, a yieldable plunger bearing on said lining and a fluid in said chamber adapted to be acted upon by compressed air from said inlet and a passageway from said pressure chamber to said control valve diaphragm whereby a predetermined pressure at the inlet of said pressure chamber will actuate said plunger to force the said non-compressible fluid against the control valve diaphragm and unseat said control valve member from the said outlet port, and a greater pressure will seat said valve member on said inlet port.

10. In an automatic air brake mechanism the combination of, a control valve comprising a valve chamber having inlet and outlet ports, the latter connected with an exhaust port, a valve member in said chamber adapted to seat on either of said ports, a stem connecting said valve member with a diaphragm, said control valve including a pressure chamber, the pressure chamber provided with inlet and outlet ports, the inlet port connected with a source of air pressure, a non-compressible liquid in said chamber above said plunger, a yieldable plunger and a fluid in said chamber adapted to be acted upon by compressed air from said inlet, the outlet port connected with an overflow chamber and provided with a piston valve element controlling said port, a diaphragm for operating said piston valve element adapted to be actuated by the air pressure in said brake mechanism and a passageway from said pressure chamber to said control valve diaphragm whereby when said piston valve element is closed by the air pressure in said brake mechanism a predetermined pressure at the inlet of said pressure chamber will actuate said plunger to force the said non-compressible fluid against the control valve diaphragm and unseat said control valve member from the said outlet port, and a greater pressure will seat said valve member on said inlet port.

11. In an automatic air brake mechanism the combination of, a control valve comprising a valve chamber having inlet and outlet ports, the latter connected with an exhaust port, a valve member in said chamber adapted to seat on either of said ports, a stem connecting said valve member with a diaphragm, resilient means normally holding said valve member on said outlet port, said control valve including a pressure chamber, the pressure chamber provided with inlet and outlet ports, the inlet port connected with a source of air pressure, a non-compressible liquid in said chamber above said plunger, a yieldable plunger, and a fluid in said chamber adapted to be acted upon by compressed air from said inlet, the outlet port connected with an overflow chamber and provided with a piston valve element controlling said port, a diaphragm for operating said piston valve element adapted to be actuated by the air pressure in said brake mechanism, resilient means normally holding said piston valve element open and a passageway from said pressure chamber to said control valve diaphragm whereby when said piston valve element is closed by the air pressure in said brake mechanism a predetermined pressure at the inlet of said pressure chamber will actuate said plunger to force the said non-compressible fluid against the control valve diaphragm and unseat said control valve member from the said outlet port, and a greater pressure will seat said valve member on said inlet port.

12. In an automatic air brake mechanism the combination of a control valve comprising a valve chamber having inlet and outlet ports, the latter connected with an exhaust port, a valve member in said chamber adapted to seat on either of said ports, a stem connecting said valve member with a diaphragm, a spring normally holding said valve member on said outlet port, said control valve including a pressure chamber, the pressure chamber provided with inlet and outlet ports, the inlet port connected with a source of air pressure and having a flexible lining separating the inlet port from said chamber, a non-compressible liquid in said chamber above said plunger, a yieldable plunger bearing on said lining and a fluid in said chamber adapted to be acted upon by compressed air from said inlet, the outlet port connected with an overflow chamber and provided with a piston valve element controlling said port, a diaphragm for operating said piston valve element adapted to be actuated by the air pressure in said brake mechanism, a spring normally holding said piston valve element open and a passageway from said pressure chamber to said control valve diaphragm whereby when said piston valve element is closed by the air pressure in said brake mechanism a predetermined pressure at the inlet of said pressure chamber will actuate said plunger to force the said non-compressible fluid against the control valve diaphragm and unseat said control valve member from the said outlet port, and a greater pressure will seat said valve member on said inlet port.

13. In an air brake mechanism of the character described, an auxiliary pressure control comprising a control valve for the outlet of the brake cylinder and a pressure chamber connected with the brake pipe, a diaphragm adapted to be actuated by the pressure in said chamber to operate said control valve, a relief valve in said chamber, and a diaphragm adapted to be actuated by pressure in the brake cylinder to close said relief valve.

14. The combination with air-brake mechanism of, a control for the outlet of the brake cylinder of said mechanism, said outlet being located in said control, said control connected to the brake pipe, comprising a fluid-holding chamber, a movable member sealing said chamber, such member exposed to the brake pipe pressure, and susceptible to variations in such pressure, a valve including a diaphragm controlling said outlet of the brake cylinder, and normally closed, such valve exposed to the brake cylinder pressure, and its diaphragm exposed to the pressure transmitted by the brake pipe to said chamber.

15. The combination with air-brake mechanism of, a control for the outlet of the brake cylinder of said mechanism, said outlet being located in said control, said control connected to the brake pipe, comprising, a fluid-holding chamber, a movable member sealing said chamber, such member exposed to the brake pipe pressure, and susceptible to variations in such pressure, a valve including a diaphragm controlling said outlet of the brake cylinder, and normally closed, such valve exposed to the brake-cylinder pressure, and its diaphragm exposed to the pressure transmitted by the brake pipe to said chamber, a mechanical resistant interposed to that movement of said member which reduces the capacity of said fluid holding chamber.

16. A control for the outlet of the brake cylinder of air brake mechanism, said outlet being located in said control, said control adapted to be connected to the brake pipe, comprising a valve including a diaphragm controlling said outlet of the brake cylinder, and normally closed, such valve exposed to the brake-cylinder pressure, and its diaphragm exposed to the pressure transmitted by the brake pipe.

17. A control for the outlet of the brake cylinder of air brake mechanism, said outlet being located in said control, said control adapted to be connected to the brake pipe, comprising, a fluid-holding chamber, a movable member sealing said chamber, such member exposed to the brake pipe pressure, and susceptible to variations in such pressure, a valve including a diaphragm controlling said outlet of the brake cylinder, and normally closed, such valve exposed to the brake cylinder pressure, and its diaphragm exposed to the pressure transmitted by the brake pipe to said chamber.

18. A control for the outlet of the brake cylinder of air brake mechanism, said outlet being located in said control, said control adapted to be connected to the brake pipe, comprising, a fluid holding chamber, a movable member sealing said chamber, such member exposed to the brake pipe pressure, and susceptible to variations in such pressure, a valve including a diaphragm controlling said outlet of the brake cylinder, and normally closed, such valve exposed to the brake cylinder pressure, and its diaphragm exposed to the pressure transmitted by the brake pipe to said chamber and a mechanical resistant interposed to that movement of said member which reduces the capacity of said fluid holding chamber.

19. A control for the outlet of the brake cylinder of air brake mechanism, said outlet being located in said control, said control adapted to be connected to the brake pipe, comprising, a housing divided by a partition into an anterior fluid holding chamber and an interior or overflow chamber, such chambers connected by a passageway, a valve normally open controlling said passageway and operative by brake cylinder pressure, a movable member sealing said anterior chamber, such member exposed to the brake pipe pressure, and susceptible to variations in such pressure and a valve including a diaphragm controlling said outlet of the brake cylinder, and normally closed, such valve exposed to the brake cylinder pressure, and its diaphragm exposed to the pressure transmitted by the brake pipe to said anterior chamber.

20. A control for the outlet of the brake cylinder of air brake mechanism, said outlet being located in said control, said control adapted to be connected to the brake pipe, comprising, a housing divided by a partition into an anterior fluid holding chamber and an interior or overflow chamber, such chambers connected by a passageway, a valve normally open controlling said passageway and operative by brake cylinder pressure, a movable member sealing said anterior chamber, such member exposed to the brake pipe pressure, and susceptible to variations in such pressure, a valve including a diaphragm controlling said outlet of the brake cylinder, and normally closed, such valve exposed to the brake cylinder pressure, and its diaphragm exposed to the pressure transmitted by the brake pipe to said anterior chamber, a mechanical resistant interposed to that movement of said member which reduces the capacity of said anterior chamber.

OLIVER SEIFFERLE.